No. 12,655. REISSUED MAY 21, 1907.
J. J. POWER.
ROTARY DISCHARGING APPARATUS.
APPLICATION FILED MAR. 11, 1907.
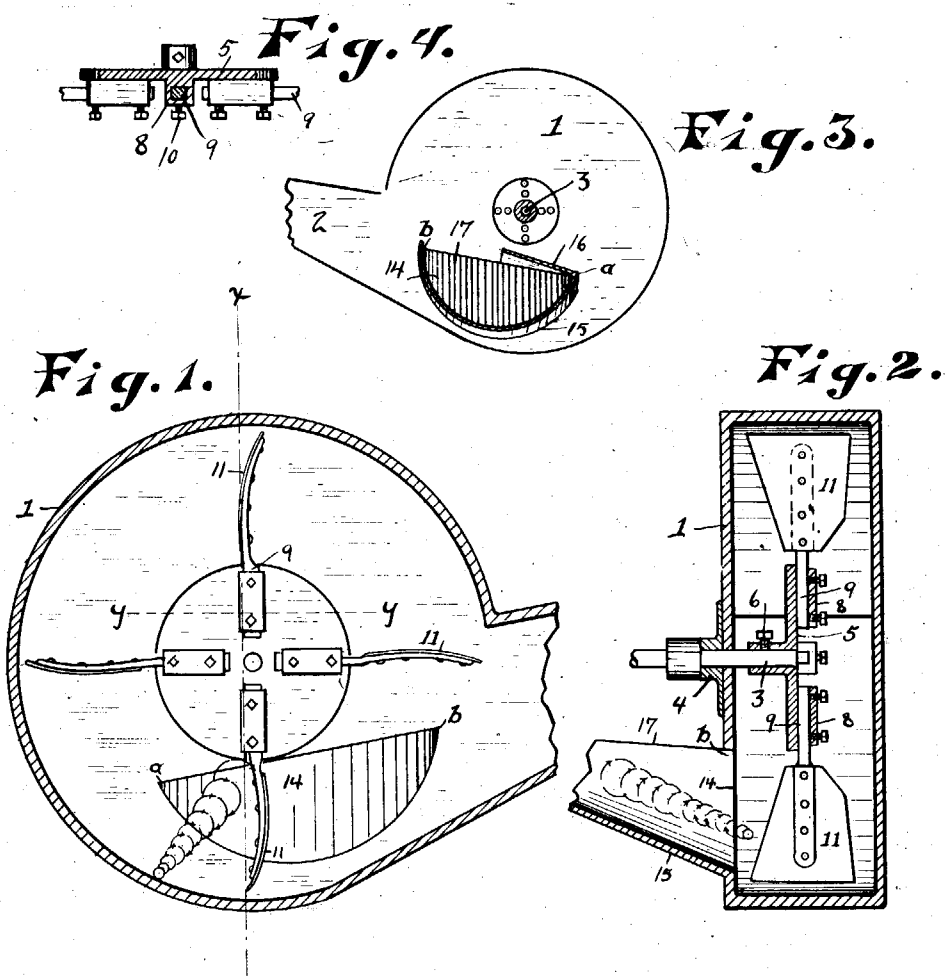
WITNESSES.
O. R. Erwin
M. M. Schulz
INVENTOR:
By Jeffrey J. Power
Erwin & Wheeler
ATTORNEYS.

UNITED STATES PATENT OFFICE.

JEFFREY J. POWER, OF MADISON, WISCONSIN, ASSIGNOR OF ONE-HALF TO LE ROY W. STEVENS, OF SYRACUSE, NEW YORK.

ROTARY DISCHARGING APPARATUS.

No. 12,655. Specification of Reissued Letters Patent. Reissued May 21, 1907.

Original No. 798,699, dated September 5, 1905. Application for reissue filed March 11, 1907. Serial No. 361,885.

*To all whom it may concern:*

Be it known that I, JEFFREY J. POWER, a citizen of the United States, residing at Madison, county of Dane, and State of Wisconsin, have invented new and useful Improvements in Rotary Discharging Apparatus, of which the following is a specification.

My invention relates to improvements in rotary discharging apparatus, the same being designed especially for use in discharging shredded cornstalks and leaves from a corn-husking machine, although my invention is also adapted and intended to be used in any case where it is desired to deliver air or other material through a pipe or chute by means of revolving wings.

Heretofore blowers have been constructed for such purposes in which the material is delivered through the chute by means of a blast of air produced by the revolving wings. In some of the constructions heretofore used the material is drawn into the blower through an axially-located eye constituting a suction-aperture. In other cases the material is discharged into the air-blast beyond the field of movement of the wings—to-wit, in the chute or delivery-passage. In the first class of cases the material and the air drawn into the blower at the eye are carried around and move outwardly by centrifugal force until discharged from the chute. In the second class of cases the air-blast is produced in the same way, but the material is driven through the chute by the force of the blast itself. In either case an extremely high speed is required, as the centrifugal force of the blast itself is relied upon for the discharge of the material.

The object of my invention is to provide a form of construction in which the material may be subjected to the direct action of the rotating wings without being carried around by them, whereby the material is struck or batted by the wings or by a cushion-film of compressed air moving immediately in front of each wing, the material being thus driven through the chute by the direct force of the rebound from the surface of the wing. A considerable reduction of speed and consequent economy of power are thus rendered possible.

In the following description reference is had to the accompanying drawings, in which,—

Figure 1 is a side view of my invention with the near wall of the casing removed and showing the inlet aperture in the remaining side wall. Fig. 2 is a vertical sectional view drawn on line X—X of Fig. 1. Fig. 3 is a side view showing the shaft and feed trough in cross-section. Fig. 4 is a sectional view drawn on line Y—Y of Fig. 1.

Like parts are identified by the same reference characters throughout the several views.

1 is a casing having a generally cylindrical form and provided with a discharge chute 2, extending tangentially from the periphery of the casing.

3 is a supporting shaft extending through a bearing 4 in the casing and provided within the casing with a disk 5, which is rigidly secured to the shaft by a set-screw 6 or in any other convenient manner. One face of the disk 5 is provided with projections 8, having radial apertures or sockets in which wing shanks 9 are adapted to fit. The shanks 9 may be adjusted radially in the sockets and are secured in any desired position of adjustment by set screws 10. Suitable wings 11 are rigidly secured to the shanks 9.

One side wall of the casing is provided with an inlet aperture 14, which is located between the axis—*i. e.*, the line of the shaft 3—and a circle in the side wall of the casing parallel with the outer circle of wing rotation. This aperture is also substantially in line with the lower end of the discharge chute 2, whereby air and other material entering the casing through the aperture 14 may be struck by the wings 11 and thrown through the chute 2 by the rebound. An inclined feed trough 15 leads to the aperture 14 and is partially covered at 16, leaving a feed opening at 17, which extends longitudinally from the casing outwardly in that portion of the upper wall of the trough nearest the discharge chute, so that the material is permitted to enter the trough along its rear upper side—*i. e.*, the upper portion of that part of the feed trough which is nearest to the discharge chute.

In operation the air within the casing 1 will be thrown outwardly by centrifugal force, creating a partial vacuum at the center and in the rear of the wings 11. Most of the air which remains in the casing is compressed upon the face or front of the wings, leaving an almost complete vacuum in the rear of the wings where they are first exposed at the front corner of the aperture 14, (indicated at *a* in Fig. 1.) The faces of the wings carry the air which is being thrown out of the casing, and this air tends to push out laterally into the trough 15 near the rear corner of the aperture 14, (indicated at *b* in Fig. 1). On the other hand, the vacuum at *a* is extended into the trough under the upper wall or part 16, and the air rushing in through the opening 17 to satisfy this vacuum passes downwardly and forwardly along the curved bottom of the trough toward the point *a* and is deflected by the trough and the light outwardly moving current at *b*, all of which tends to cause the downwardly, forwardly, and inwardly moving current to rotate spirally in a cyclonic whirl and in a direction opposite that of wing rotation. The force and intensity of this whirling current increase as it approaches the inlet aperture 14, so that the material is not only carried between the wings, but whirled forcibly against the wings and batted by them through the discharge spout. The aperture 14 is preferably so located that the outer ends of the wings 11 when in normal position will project past such aperture, whereby all the material entering the aperture will be struck by the wings. Experiments which I have conducted in connection with the delivery of shredded cornstalks have demonstrated that a speed of approximately three hundred and fifty revolutions per minute will be sufficient to deliver the material through a chute such as would require a speed of approximately eight hundred revolutions per minute in an ordinary blower having an intake or suction aperture at the eye.

While I have shown and described my invention in connection with a feed trough having a concave bottom and a feed opening in one portion of its upper side, the specific form of the trough, or of the opening, is not essential, although useful and desirable in some circumstances, especially for the delivery of comparatively heavy material such as shredded corn stalks. So far as I am informed, I am the first in this art to provide a feed opening in the fan casing which does not admit air at the axis, but which is located between the axis and the periphery of the casing or a circle described by the outer ends of the revolving wings, and adjacent to the discharge outlet in the line of wing approach to such outlet. The opening being principally outside of a circle described by the inner ends of the wings, so that the air or other material entering the casing is subjected to the direct action of the wings and thrown through the discharge chute on the rebound instead of passing out radially, by centrifugal action, from at or near the axis into the path of the wings, and picking up the speed of rotation gradually. By providing a feed opening adapted to deliver directly into the path of the wings at such a point as to get the maximum effect of the rebound into the discharge passage and preventing the entry of air along the axis or elsewhere than at such feed opening, so as to secure the required suction at the intake, the revolving wings are found to operate with great efficiency. The central disk 5 to which the wings are secured apparently serves to prevent the formation of eddy currents, and aids to some extent in promoting or permitting the formation of the spiral suction current at the intake.

The extension 16 of the wall of the trough to partially cover the feed passage on the side of wing approach is an important contributing feature especially for heavy materials, where a strong suction is important or where a concentration of the current to secure a maximum capacity is desired. The use of this feature is therefore preferred, especially for the heavier materials, although it may be dispensed with if desired, and particularly so when feeding dry straw. It will be observed that the feed aperture 14 is elongated along the line of wing approach toward the discharge outlet, thus permitting the delivery of a maximum quantity of material into the path of the revolving wings adjacent to such outlet.

Having thus described my invention what I claim as new and desire to secure by Letters Patent is,

1. In a device of the described class, the combination of an inclosing casing provided with a discharge aperture; a set of revolving wings in said casing; and a feed trough leading to an aperture in the casing between its periphery and the axis of wing rotation; said feed trough being partially open to the exterior adjacent to the casing.

2. In a device of the described class, the combination of a set of revolving wings; an inclosing casing therefor, provided with a peripheral discharge aperture and having an inlet aperture in its side wall between the axis and a circle parallel with the outer circle of wing rotation; and an inclined feed trough having a feed opening along one side and arranged to admit air tangentially and deflect it along a spiral line leading to that portion of the inlet aperture where the rotary wings are first exposed.

3. In a device of the described class, a set of revolving wings; a casing inclosing the same, and provided with a peripheral discharge opening; a feed trough leading to an inlet aperture in the casing at one side of the path of the wings and between the axis of their rotation and a circle in the side wall of the casing parallel with the circle described by the outer edges of the wings; said feed trough having a feed opening in one of its side walls, extending outwardly from a point adjacent to the inlet aperture of the casing.

4. In a device of the described class, a set of revolving wings; a casing inclosing the same, and provided with a peripheral discharge opening, a feed trough leading to an inlet aperture in the casing at one side of the path of the wings and between the axis of their rotation and a circle in the side wall of the casing parallel with the circle described by the outer edges of the wings; said feed trough having a feed opening extending outwardly from adjacent to the inlet aperture of the casing and in the rear portion of the upper wall of the trough.

5. In a device of the described class, a set of revolving wings; a casing inclosing the same; a discharge chute leading tangentially from the periphery of the casing; and a feed trough communicating with the interior of the casing through an aperture at one side of the axis of the discharge chute projected within the casing, and between the wing axis and the outer circle of wing rotation; said feed trough having a longitudinal opening in that portion of its upper wall nearest the discharge chute.

6. In a device of the described class, a set of revolving wings; a casing inclosing the same; a discharge chute leading tangentially from the periphery of the casing; and a feed trough communicating with the interior of the casing through an aperture at one side of the axis of the discharge chute projected within the casing, and between the wing axis and the outer circle of wing rotation; said feed trough having a concave bottom and a longitudinal opening in that portion of its upper wall nearest the discharge chute.

7. In a device of the described class, the combination of an inclosing casing provided with a discharge aperture; a set of revolving wings in said casing; and a feedway leading to a feed aperture in the casing between its periphery and the axis of wing rotation only; said feed way being open to the exterior adjacent to the casing.

8. In a device of the described class, the combination of an inclosing casing provided with a discharge aperture; a set of revolving wings in said casing; and a feed way leading to a feed aperture in the casing between its periphery and the axis of wing rotation and principally between the periphery and a circle described by the inner ends of the wings, the casing being closed at all points except at such feed opening and said discharge aperture; said feed way being open to the exterior adjacent to the casing, and said feed aperture being located adjacent to the discharge aperture on the side of wing approach.

9. In a device of the described class, the combination of an inclosing casing provided with a discharge aperture; a set of revolving wings in said casing; and a feed way leading to a feed aperture in the casing the latter extending only between its periphery and the axis of wing rotation, adjacent to the discharge aperture on the side of wing approach; said feed way being open to the exterior adjacent to the casing, and said feed aperture being elongated along the line of wing approach toward the discharge outlet.

10. In a device of the described class, the combination of an inclosing casing provided with a discharge aperture; and a set of revolving wings in said casing; a feed way open to the exterior adjacent to the casing and leading to a feed opening in one of the side walls of the casing between its periphery and the axis of wing rotation, adjacent to the discharge aperture on the side of wing approach; said wings being connected with and supported from a central rotary shaft by means of a transversely disposed disk rigidly connected with the shaft.

In testimony whereof I affix my signature in the presence of two witnesses.

JEFFREY J. POWER.

Witnesses:
EDW. J. REYNOLDS,
CHARLES CUNNIEN.